United States Patent

Geiger et al.

[11] Patent Number: 5,810,291
[45] Date of Patent: Sep. 22, 1998

[54] CONTINUOUS MOLDLINE TECHNOLOGY SYSTEM

[76] Inventors: Michael Watson Geiger, 2639 Louis Ave., St. Louis, Mo. 63144; John Cleveland Waldrop, III, Calle de la Fuente, No. 26, Humera-Pozuelo de Alarcon, Madrid, Spain, 28223

[21] Appl. No.: 616,485

[22] Filed: Mar. 19, 1996

[51] Int. Cl.⁶ .................................................. B64C 39/00
[52] U.S. Cl. ............................................ 244/133; 16/225
[58] Field of Search ................................ 244/219, 133, 244/123; 160/236; 16/225

[56] References Cited

U.S. PATENT DOCUMENTS

| | | | |
|---|---|---|---|
| 1,379,921 | 5/1921 | Holle | 244/219 |
| 2,039,372 | 5/1936 | Wickmann | 160/236 |
| 2,736,521 | 4/1956 | Bosserman | 244/135 |
| 2,973,170 | 2/1961 | Rodman | 244/133 |
| 3,023,860 | 3/1962 | Ellzey | 189/34 |
| 3,116,085 | 12/1963 | Uttley | 296/26 |
| 3,893,639 | 7/1975 | Croswell | 244/219 |
| 4,046,277 | 9/1977 | Morrison | 220/1.5 |
| 4,429,844 | 2/1984 | Brown et al. | 244/219 |
| 5,071,092 | 12/1991 | Williams et al. | 244/129.1 |
| 5,222,699 | 6/1993 | Albach et al. | 244/213 |

FOREIGN PATENT DOCUMENTS 1536903  10/1963  France .................... 244/219

*Primary Examiner*—Andres Kashnikow
*Assistant Examiner*—Tien Dinh
*Attorney, Agent, or Firm*—Dale B. Halling

[57] ABSTRACT

A continuous moldline technology system (100) has a pair of end blocks (102, 104). One (102) of the pair of end blocks (102, 104) has an edge (112) attached to a first edge of an elastomer panel (110). The other block (104) has an edge attached to a second edge (114) of the elastomer panel (110). A composite slat (116) having a rectangular cross section is partially disposed inside the elastomer panel (110).

21 Claims, 6 Drawing Sheets

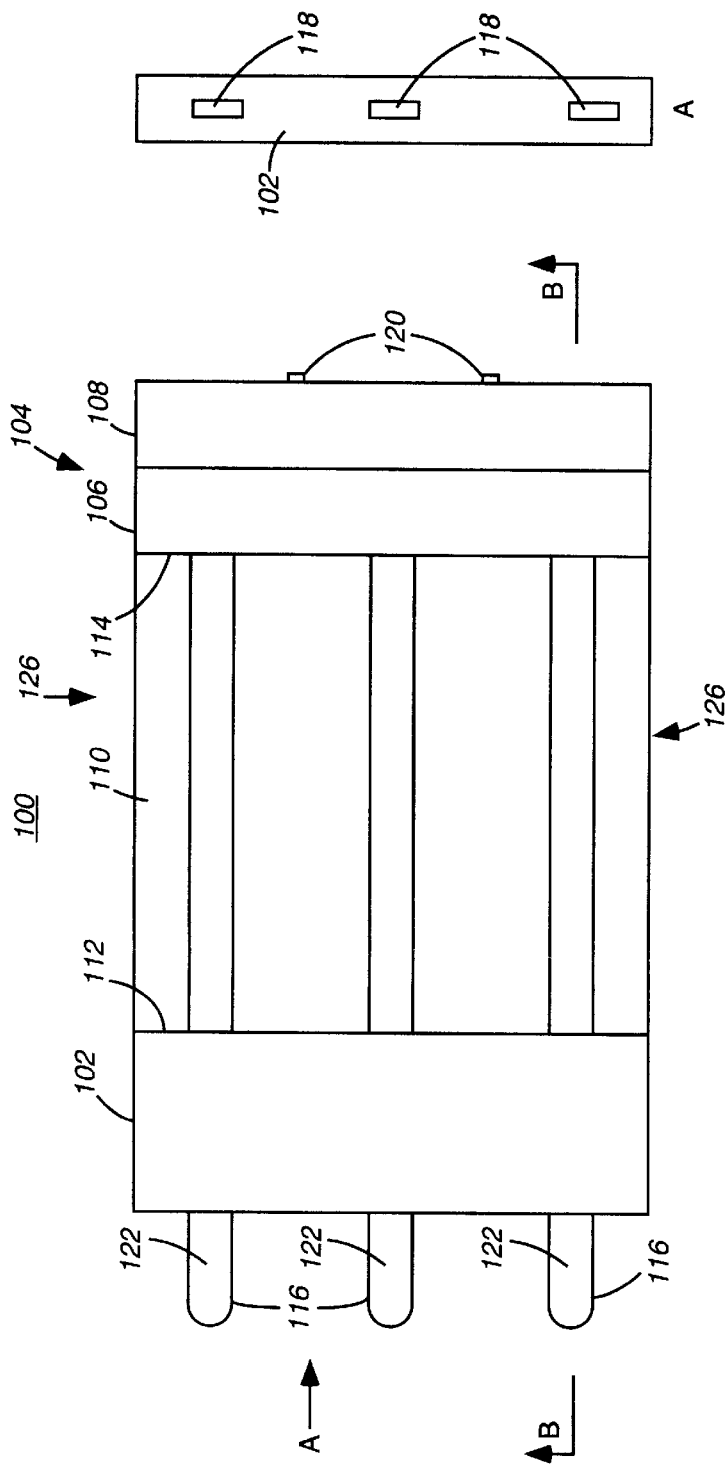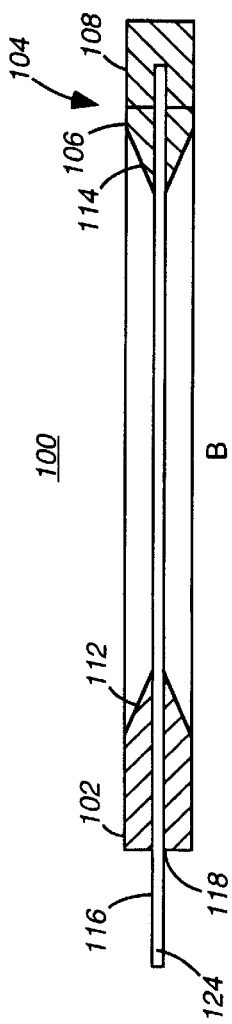

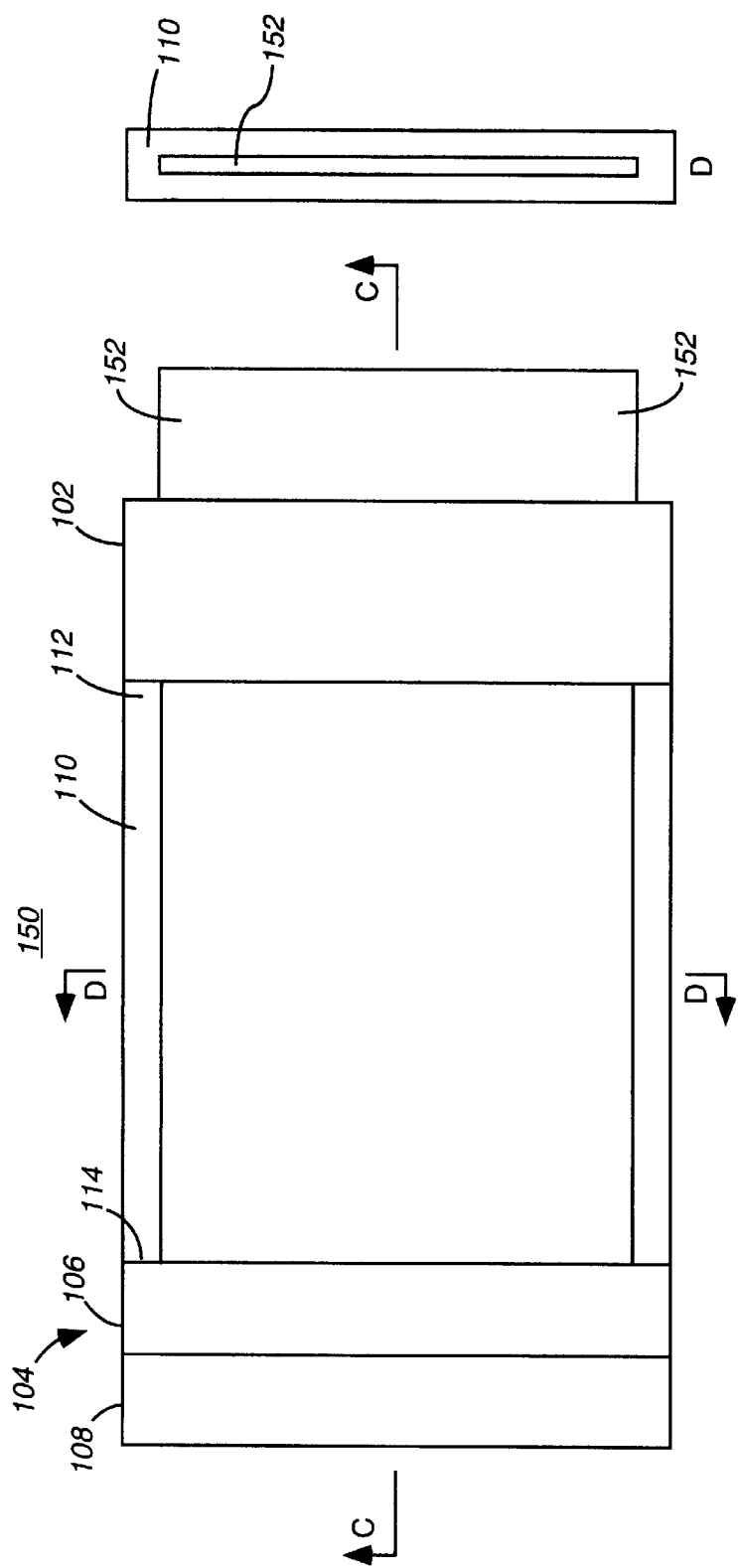

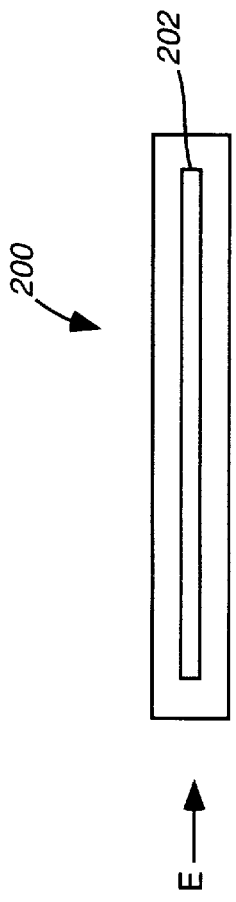
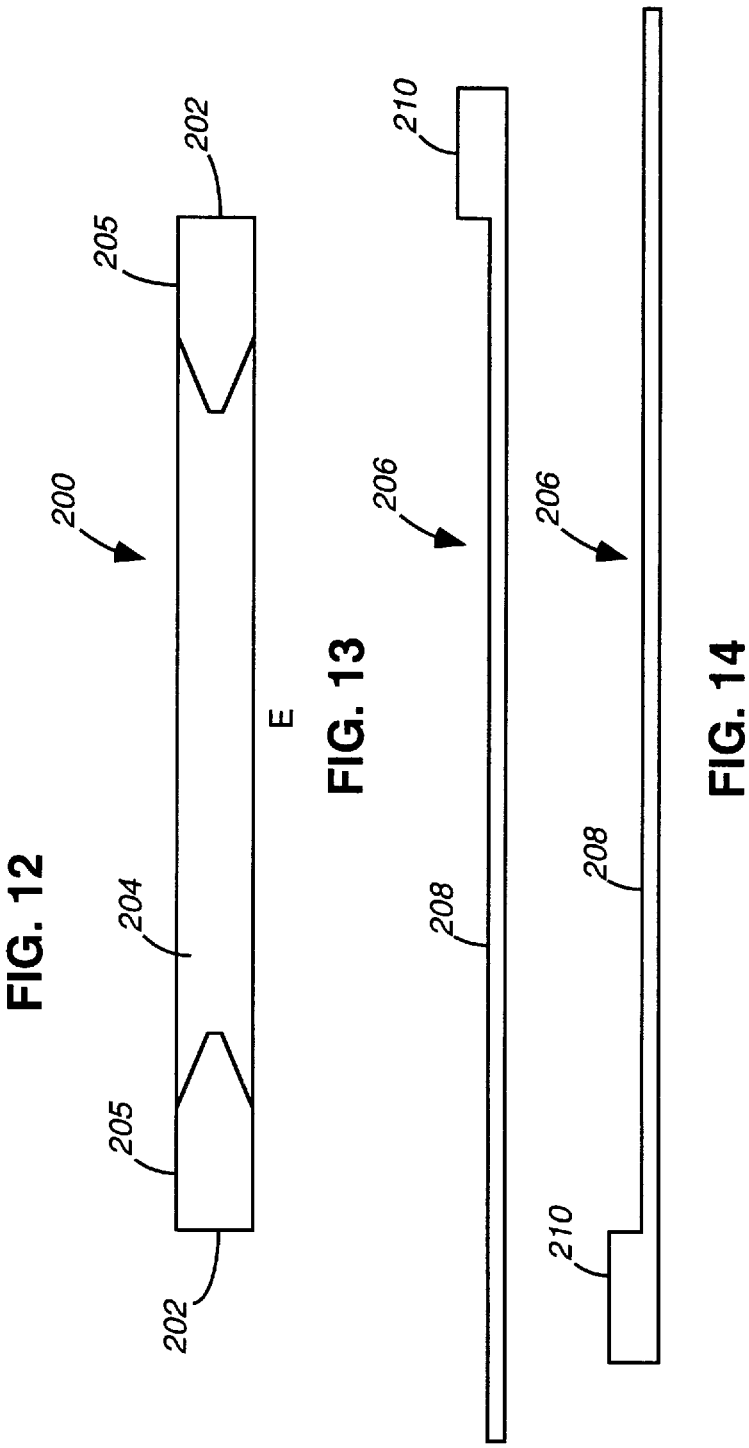
FIG. 12
FIG. 13
FIG. 14

CONTINUOUS MOLDLINE TECHNOLOGY SYSTEM

FIELD OF THE INVENTION

The invention relates generally to the field of flexible surfaces and more particularly to a continuous moldline technology system.

BACKGROUND OF THE INVENTION

Continuous moldline technologies have been developed for aircraft control surfaces. An example of a prior art continuous moldline technology 10 is shown in FIG. 1. The continuous moldline technology 10 has a pair of metal blocks 12, 14 with an elastomer section 16 extending between the pair of metal blocks 12, 14. Composite rods 18 usually extend through the elastomer section 16 and have a free end 20 extending past the outer edge 22 of one 12 of the pair of blocks. The attached end 24 of the composite rods 16 is embedded in the other 14 of the pair of blocks. The elastomer section 16 is highly flexible and can be stretched 50% its normal length and still return to its original form. The composite rods 18 are flexible and when the continuous moldline technology 10 is elongated and/or deflected, see FIG. 2, the flexible rods provide a smooth continuous shape to the elastomer section 16. This is particularly important in aircraft because it reduces turbulence and drag caused by gaps and discontinuities in control surfaces. However a couple of problems have arisen with the prior art continuous moldline technology products. One problem is that when one of the flexible rods 18 breaks or becomes damaged the whole assembly 10 must be replaced. In addition the composite rods cannot be inspected. A second problem is caused by "Poisson's Effect", when the metal blocks 12, 14 are pulled away from each other the unsupported edges 26 of the elastomer 16 tend to contract or pull in.

One solution has been to install composite rods 18 with a larger diameter, that are stiffer, however this causes the whole assembly 10 to be less flexible. The thicker composite rods 18 increases the weight of the assembly. Another problem with the rods is that the only viable manufacturing technique is to pultrude the rods This process inherently limits the rods to lower temperature composite matrices, and results in the rods 16 having a maximum operating temperature of 250 degrees Fahrenheit.

Thus there exists a need for a continuous moldline technology system that limits the Poisson's Effect without increasing the weight of the system. In addition, the composite rods need to be inspectable and replaceable without replacing the whole assembly. Finally the composite rods need to have a higher maximum operating temperature.

SUMMARY OF THE INVENTION

A continuous moldline technology system that overcomes these problems has a pair of end blocks. One of the pair of end blocks has an edge attached to a first edge of an elastomer panel. The other block has an edge attached to a second edge of the elastomer panel. A composite slat having a rectangular cross section is partially disposed inside the elastomer panel.

BRIEF DESCRIPTION OF THE DRAWINGS

FIG. 6 is a top view of an alternative embodiment of the continuous moldline technology system according to the invention;

FIG. 7 is an end view of an end block of the continuous moldline technology system of FIG. 6;

FIG. 8 is a cross sectional view of the continuous moldline technology system of FIG. 6 taken along the B—B line;

FIG. 9 is a top view of an alternative embodiment of the continuous moldline technology system according to the invention;

FIG. 10 is a cross sectional view of the continuous moldline technology system of FIG. 9 taken along the D—D line;

FIG. 11 is a cross sectional view of the continuous moldline technology system of FIG. 9 taken along the C—C line;

FIG. 12 is an end view of part of an alternative embodiment of the continuous moldline technology system according to the invention;

FIG. 13 is a side view of the continuous moldline technology system FIG. 12; and FIG. 14 is a side view of a plate used in the continuous moldline technology system of FIG. 12.

DETAILED DESCRIPTION OF THE DRAWINGS

Figure 3:
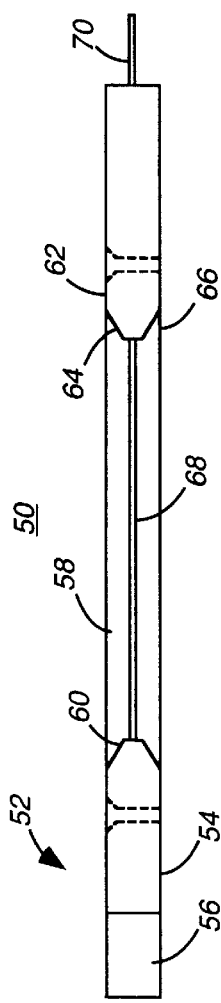
FIG. 3 is a side view of a continuous moldline technology system according to the invention.
Figure 4:
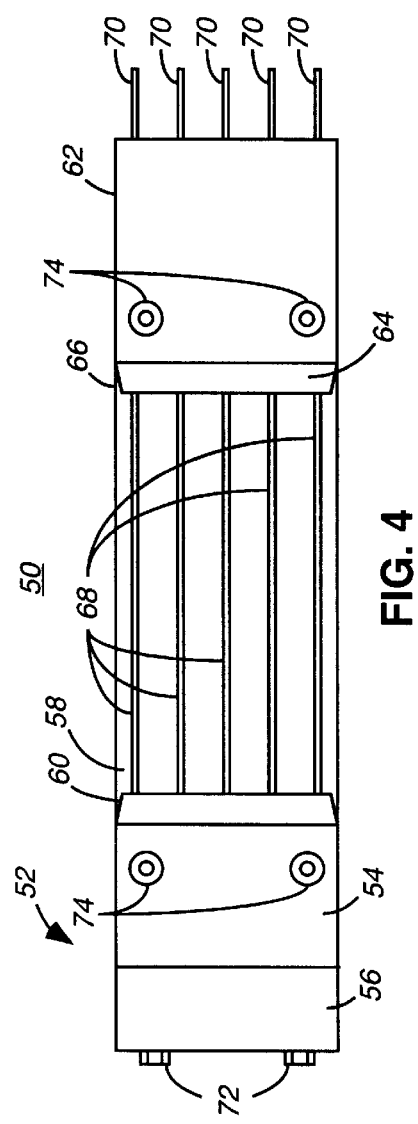
FIG. 4 is a top view of the continuous moldline technology system of FIG. 3.
Figure 5:
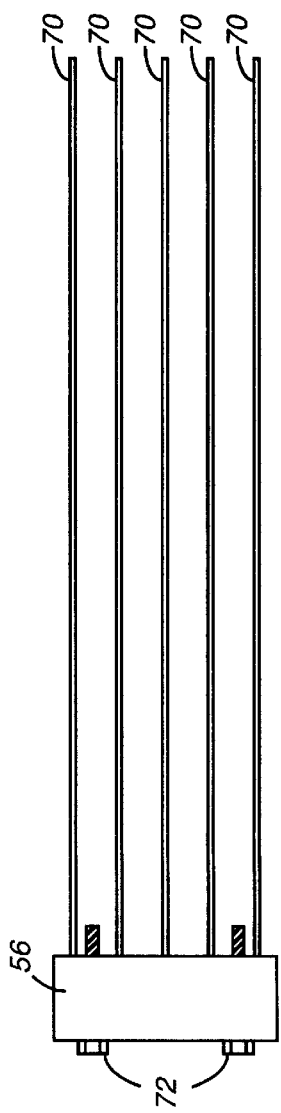
FIG. 5 is a top view of a comb used in the continuous moldline technology system of FIG. 4.

The embodiment of the invention shown in FIGS. 3–5 provides for the inspection and replacement of the flexible rods. A continuous moldline technology system 50 has a first header 52 having a first part 54 and a second part (platform section) 56. The first part 54 has an edge attached to a first edge 60 of an elastomer panel 58. A second header 62 has an interior edge 64 attached to a second edge 66 of the elastomer panel 58. In one embodiment the elastomer panel is made from silicone. The elastomer panel 58 has a cavity 68 extending from the first edge 60 to the second edge 66. The second header 62 has a slot (not shown) that aligns with the cavity 68 in the elastomer panel 58. The first part 54 of the first header 52 has a slot (not shown) that also aligns with the cavity 68. A flexible reinforcement member 70 is attached to the second part 56 of the first header 52. The flexible reinforcement member 70 slides through the slot in the first part 54, the cavity 68 and the slot in the second header. The second part 56 can be removably attached to the first part 54 by a pair of bolts 72 or other attachment mechanism. The first header 52 and the second header 62 can be attached to a structure, such as an airplane, by a plurality of bolts 74.

FIGS. 6–8 show an alternative embodiment of the continuous moldline technology system 100. The continuous moldline technology system 100 has replaceable and inspectable slats that have a maximum operating temperature above 250 degrees Fahrenheit and that eliminate the Poisson's Effect in the elastomer section. The system 100 has a pair of end blocks 102, 104. The second end block 104 has a first part 106 and a second part 108. An elastomer panel 110 has a first edge 112 attached to a first 102 of the pair of end blocks and a second edge 114 attached to a second 104 of the pair of end blocks. A composite slat 116 having a rectangular cross section is partially disposed in the elastomer 110. The composite slat 116 is affixed to the second part 108 and slides through an access in the first part 106, a cavity in elastomer 110 and an access 118 in the first 102 of the pair of end blocks. The second part 108 is removable attached to the first part 106. This is accomplished by a pair of bolts 120 in FIG. 6, but can be accomplished by a variety of other means.

Figure 1:
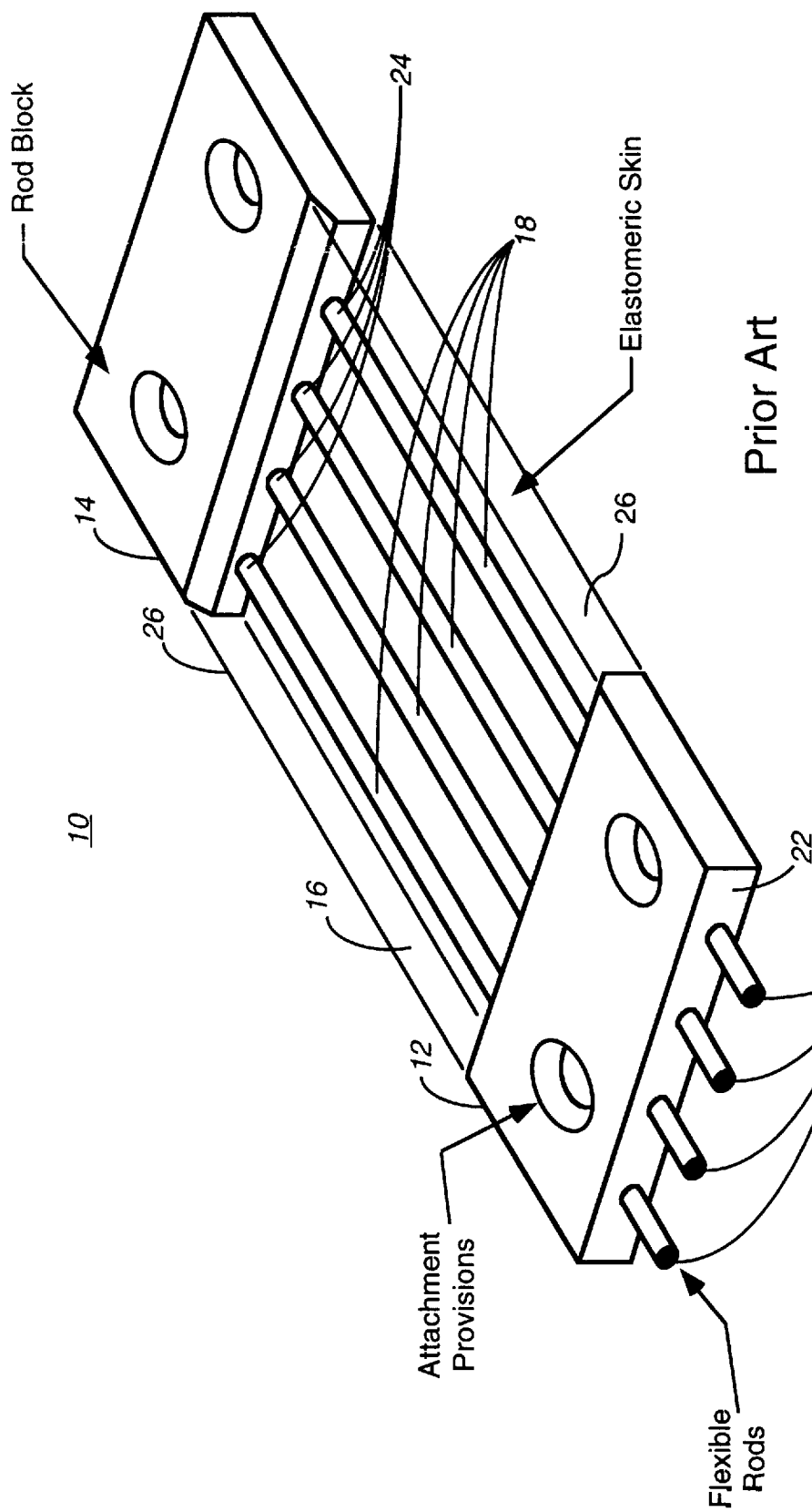
FIG. 1 is a perspective view of a prior art continuous moldline technology.
Figure 2:
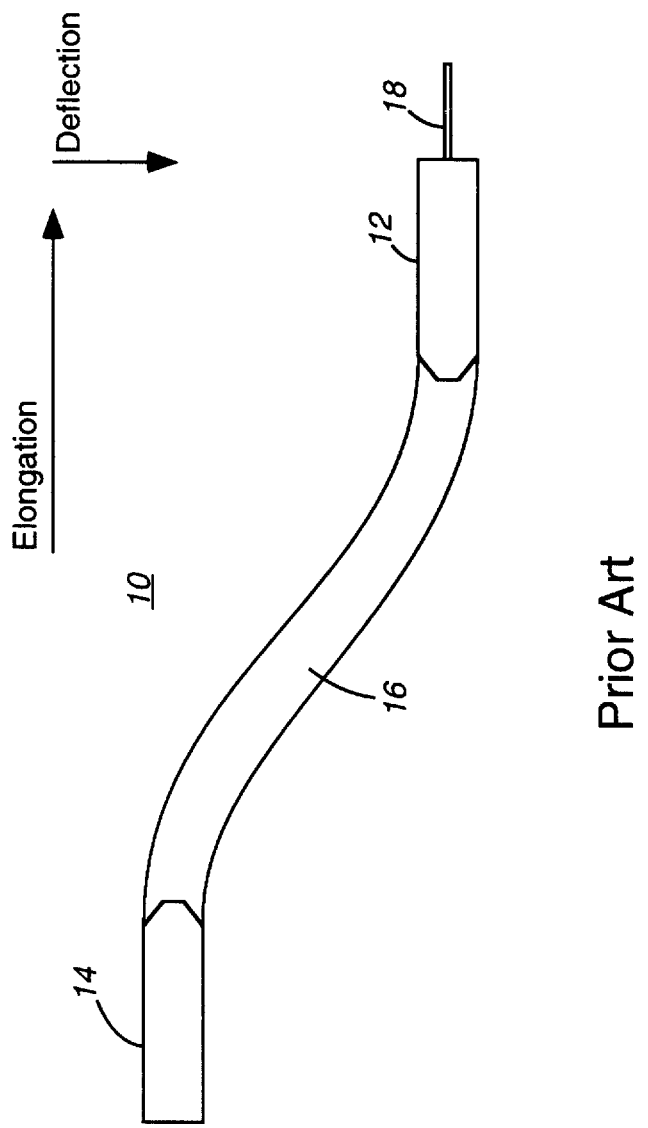
FIG. 2 is a side view of the prior art continuous moldline technology of FIG. 1.

The rectangular cross section of the slat 116 provides the slat 116 with non-uniform stiffness. In other words, the slat 116 exhibits less stiffness to a force perpendicular to its face 122, than a force perpendicular to its edge 124. As a result the slats 116 are flexible to a deflection (see FIG. 2) but stiff in the direction, shown by arrow 126, of the force due to Poisson's Effect that occurs during elongation (see FIG. 2). The structure of the slats 116 also allows the slats to be manufactured by a method other than pultrusion. As a result the slats 116 have a maximum operating temperature above 300 degrees Fahrenheit.

FIGS. 9–11 show an alternative embodiment of the continuous moldline technology system 150. The continuous moldline technology system 150 of FIGS. 9–11 is similar to the system 100 of FIGS. 6–8 except the slat 116 are replaced with a plate 152. Because of the similarities the same reference numeral is used for similar parts. The system 150 in FIGS. 9–11 has the advantages listed above for the system 100 in FIGS. 6–8.

FIGS. 12–14 show an alternative embodiment of the continuous moldline technology system. The system has a rectangular box 200 having a pair of open ends 202 and an elastomer section 204. The rectangular box 200 has a pair of headers 205. In one embodiment the pair of headers 205 are made from titanium. In another embodiment the pair of headers 205 are made from a composite material. A plate 206 (see FIG. 14) has a tongue section 208 and a head section 210. The tongue section 208 slides through the pair of open ends 202, but the head section 210 is too large to fit through the open ends 202. In the preferred embodiment, two plates 206 fit through the open ends 202 with one of the heads 210 pointed up and one pointed down. In one embodiment the plate 206 is made of a composite material.

The shape of the plate 206 provides stiffness that varies with the direction of the applied force, like the slats 116 of FIGS. 6–8. This allows the plates to eliminate the gaps that otherwise form between the elastomer edges and the adjacent material when the system is elongated. In addition, the plate also has a maximum operating temperature above 300 degrees Fahrenheit.

Thus there has been described a continuous moldline technology system that limits the Poisson's Effect without increasing the weight of the system. In addition, the flexible reinforcement members are inspectable and replaceable without replacing the whole assembly. Finally the flexible reinforcement members have a higher maximum operating temperature than prior art designs.

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

What is claimed is:

1. A continuous moldline technology system comprising:
   a pair of end blocks;
   an elastomer panel having a first edge attached to an edge of a first of the pair of end blocks and having a second edge attached to an edge of a second of the pair of end blocks; and
   a composite slat having a rectangular cross section, the composite slat being partially disposed inside the elastomer panel.

2. The system of claim 1, wherein one of the pair of end blocks has an access for inserting the composite slat into the elastomer panel.

3. The system of claim 1, wherein one of the pair of end blocks has a platform section attached to the composite slat.

4. The system of claim 1, wherein the composite slat is attached to one of the pair of blocks.

5. The system of claim 1, wherein the composite slat has non-uniform stiffness.

6. The system of claim 1, wherein the composite slat has a maximum operating temperature above 250 degrees Fahrenheit.

7. A continuous moldline technology system comprising:
   a first header;
   an elastomer panel having a first edge affixed to an edge of the first header, the elastomer panel having a cavity extending from the first edge to a second edge;
   a second header having an interior edge affixed to the second edge of the elastomer panel, the second header having a slot extending from the interior edge to an exterior edge and the slot being aligned with the cavity; and
   a flexible reinforcement member removable inserted into the slot and the cavity.

8. The system of claim 7, wherein the flexible reinforcement member is free to slide within the slot as the continuous moldline technology system is deformed.

9. The system of claim 8, wherein the flexible reinforcement member has a non-uniform stiffness.

10. The system of claim 7, wherein the first header comprises:
    a first part attached to the elastomer panel and having a slot aligned with the cavity; and
    a second part attached to the flexible reinforcement member.

11. The system of claim 10, wherein the second part is removable attached to the first part.

12. The system of claim 8, wherein the flexible reinforcement member is made from a composite material.

13. The system of claim 12, wherein the flexible reinforcement member has a maximum operating temperature above 300 degrees Fahrenheit.

14. A continuous moldline technology system comprising:
    a rectangular box with a pair of open ends having an elastomer section; and
    a plate having a head section and a tongue section, the tongue section sliding through the pair of open ends and the head section not sliding through the pair of open ends.

15. The system of claim 14, wherein the plate is made of a composite material.

16. The system of claim 15, wherein the plate has an operating temperature above 250 degrees Fahrenheit.

17. The system of claim 14, wherein the plate has a stiffness that varies with a direction of an applied force.

18. The system of claim 14, wherein the elastomer section is made of silicone.

19. The system of claim 14, wherein the rectangular box has a pair of headers, one of the pair of headers at each of the pair of open ends and each of the pair of headers being attached to the elastomer section.

20. The system of claim 19, wherein the pair of headers are made from titanium.

21. The system of claim 19, wherein the pair of headers are made of a composite material.

* * * * *